Dec. 14, 1954   W. H. WRIGHT ET AL   2,696,663
CONVERTER SUPPORTING CAR
Filed Aug. 1, 1949   5 Sheets-Sheet 1

INVENTORS
WILBERT H. WRIGHT &
ANTHONY B. CAVALLE
BY
ATTORNEY

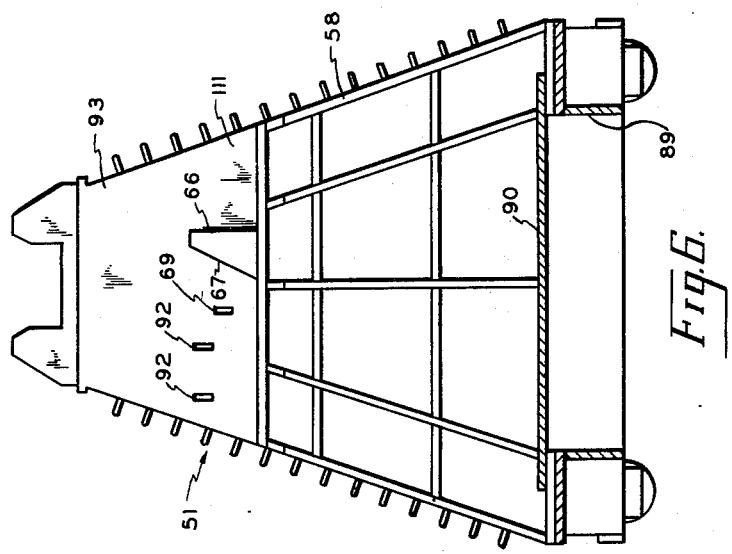
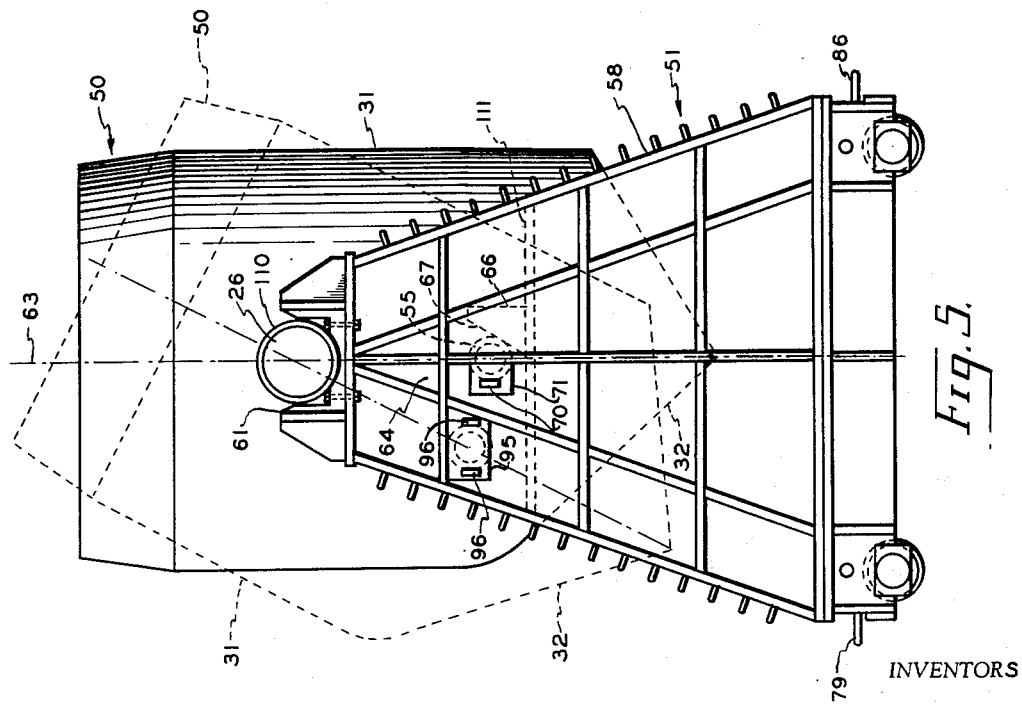

United States Patent Office 2,696,663
Patented Dec. 14, 1954

2,696,663

CONVERTER SUPPORTING CAR

Wilbert H. Wright and Anthony B. Cavaile, Weirton, W. Va., assignors to National Steel Corporation, a corporation of Delaware Application August 1, 1949, Serial No. 108,012

8 Claims. (Cl. 29—288)

The present invention relates to Bessemer or converter plants and more particularly relates to an improved converter plant in which the converters are relined in a novel manner by means of improved apparatus including a novel car for supporting a converter while being relined.

In converter plants, there is one and usually a plurality of converters. Molten pig iron is periodically poured into the converter and then an air blast is blown through the molten iron to reduce the silicon, carbon and metalloids present in the iron. After the metal has been blown, the resultant product may be molten steel, Bessemer steel, or the blown metal may be charged into an open hearth to produce open hearth steel by the so-called "duplex process" or by a modification of this process. Each converter is mounted on trunnions carried by fixed piers or supports in a permanent location or blowing station. The necessary auxiliary equipment for operating the converter also is installed at the blowing station. At intervals, the converter, which is essentially a steel shell lined with refractory material, must be shut down to permit repairs to or replacement of the refractory lining which is eroded during the blowing operations. The converter can not be operated while it is being relined so that when it is necessary to reline the converter, production of the plant drops materially. If two converters are used in the plant, production drops fifty percent. In addition to the drop in production, a large quantity of auxiliary equipment is either idle or is being used at only a small part of its total capacity. This in turn increases the capital investment required per ton of blown metal produced. The plant must be designed to produce, when in operation, blown metal at a relatively higher rate in order to maintain the relatively lower average rate which will result in the necessary production over a period of time. If the plant must produce a thousand tons of blown metal during a certain period, then the plant must have a maximum converter capacity greater than this quantity to allow for the time when the converters are not in operation and producing blown metal.

It is an object to provide a novel converter car for use in a converter plant to facilitate relining and repairing a converter.

It is an object of the present invention to provide a novel converter car that will support and hold the converter in the desired one of a number of up-ended positions that will facilitate relining the various portions of the converter.

In accordance with the present invention, there are provided an improved method of operating a converter plant and an improved converter plant or system including a novel converter which enables a converter to be more readily relined or repaired while maintaining production of blown metal at all of the blowing stations. In addition to one or a plurality of blowing stations, each including a converter mounted on fixed supports for blowing metal, the converter system includes a novel relining or repair station at which there is a novel, movable car carrying a spare converter. When one of the converters at a blowing station becomes eroded and must be relined with refractory material, this converter is exchanged for the spare converter on the car. The eroded converter is removed from the blowing station and the spare converter is placed in position on the fixed supports at the blowing station. Thus, there is only a relatively short period during which the blowing station is not in operation. The eroded converter removed from the blowing station is placed on the converter car at the relining station and then becomes the spare converter after relining. After being relined, the converter can be used to replace a converter at any one of the blowing stations. The car that supports the spare converter is constructed in a novel manner to facilitate the removal from and the placement thereon of a converter and to facilitate the relining and repair of a converter while being supported by the car. Other equipment including an improved building is also provided at the relining station to aid in more quickly and easily relining the converter on the car. Not only is the time lost at the blowing station greatly reduced, but the time and effort required for relining a converter after removal from the blowing station is reduced.

These and other objects and advantages will become apparent from the following description, taken with the accompanying drawings, in which:

Figure 5 is an end elevational view of the converter car of Figure 4; and,

Figure 6 is a sectional view taken along line 6—6 of Figure 4.

Figure 1:
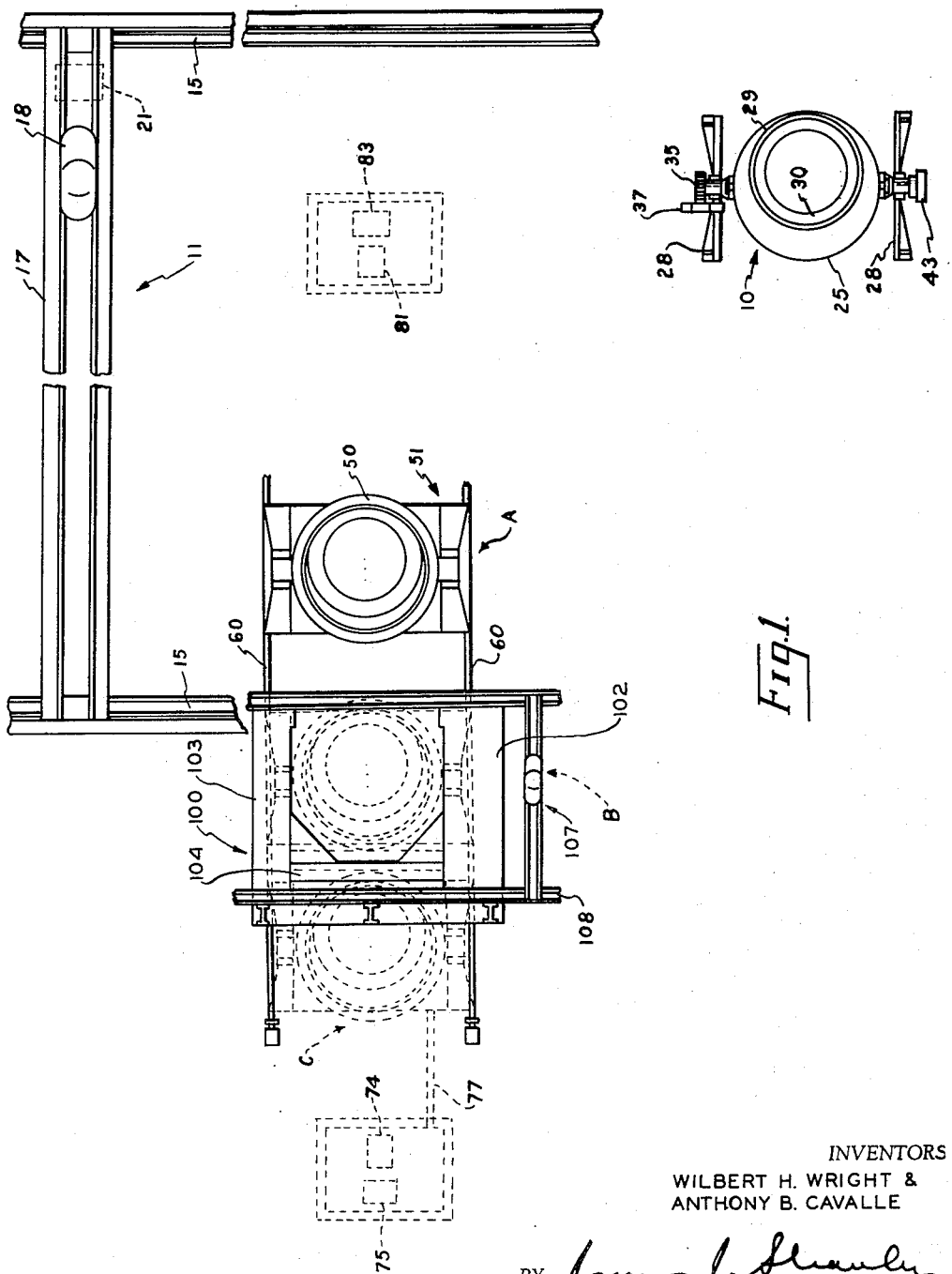
Figure 1 is a plan view of a converter plant embodying the principles of the present invention and having some portions removed to better illustrate the present invention.
Figure 2:
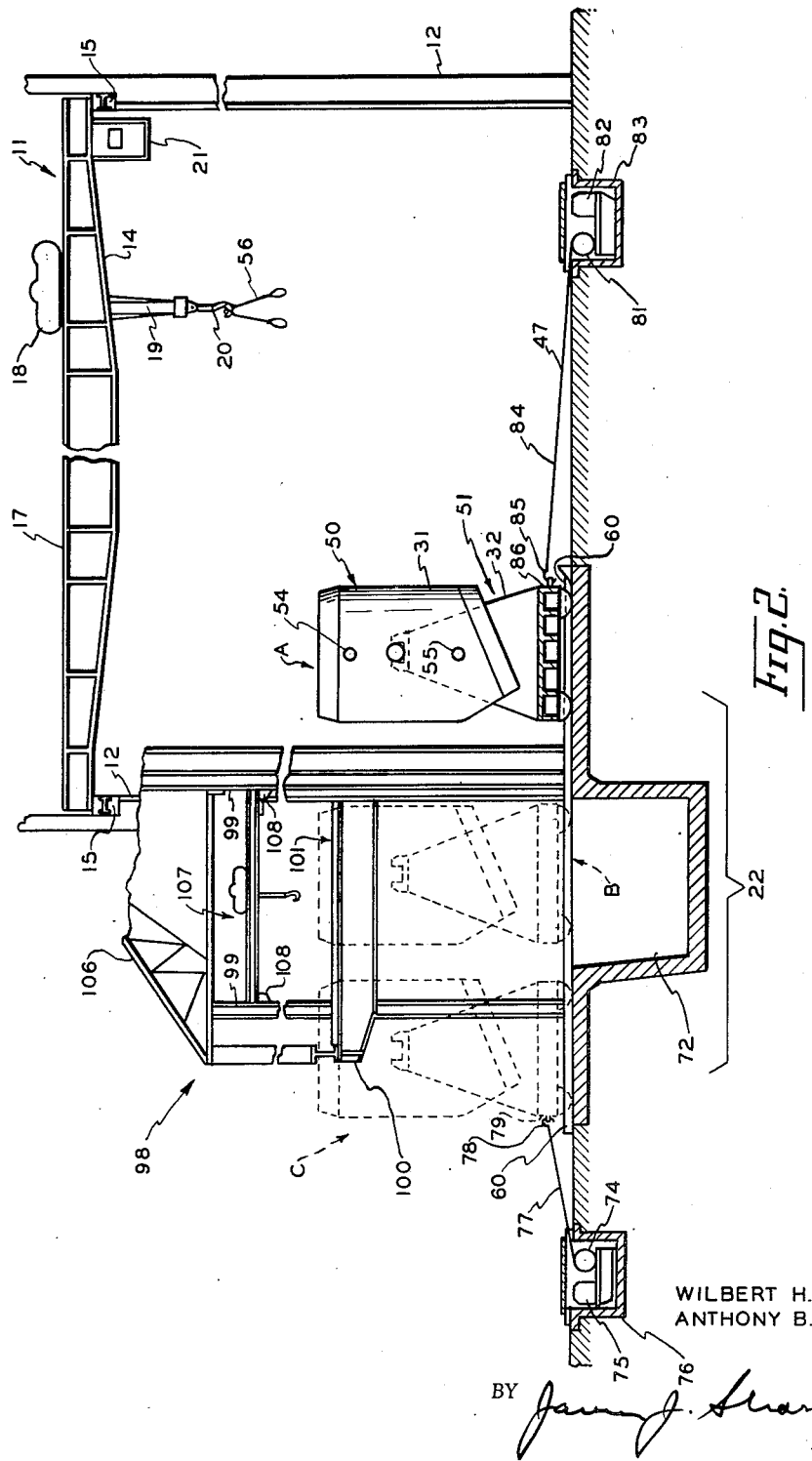
Figure 2 is a side view partially in section of the plant of Figure 1.

Referring to the drawings and particularly Figures 1 and 2, the converter plant includes a blowing station 10. Usually, there will be a pair or a number of pairs of similar blowing stations in the plant. An overhead crane 11 is mounted on building columns 12 disposed at opposite sides of the enclosing building, shown in part, which may be of any suitable type. The crane 12 includes a main, motor driven carriage 14 mounted on rails 15 carried by the two sets of building columns 12 so that the crane carriage 14 can move longitudinally of the plant along rails 15. The main carriage 14 carries rails 17 which extend in a direction transverse to rails 15. A relatively smaller, motor driven carriage 18 is mounted on the rails 17, and this carriage 18 carries the customary motor driven drum, not shown, for raising or lowering the cable 19 and hook 20 on the end of the cable. An operator while positioned in cab 21 can operate the controls for moving the crane 11 along rails 15, for moving the carriage 18 along rails 17, and for raising and lowering the crane hook 20. The crane 11 may be of any suitable type customarily used around steel plants for conveying materials around the plant.

The converter plant in addition to including a crane 11 and a converter installation or blowing station 10, which are customary also includes a novel relining or repair station at 22. This relining station will be more fully described later.

Figure 3:
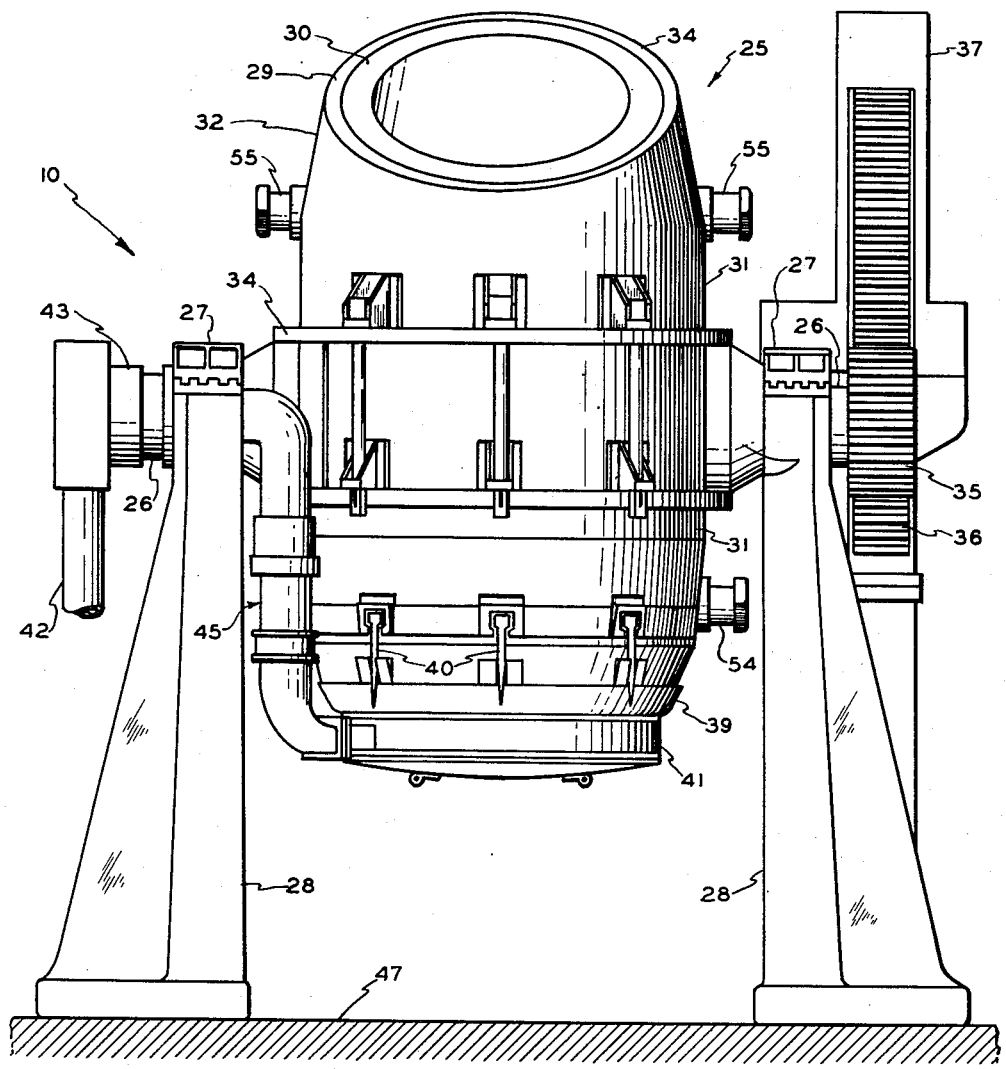
Figure 3 is an enlarged view in elevation of the converter arranged for blowing metal that is shown in Figure 1.

Referring more particularly to Figures 1 and 3, at the blowing station or converter installation 10, there is a converter 25 mounted on a pair of trunnions 26 rotatably mounted in bearings 27 carried by fixed piers 28 which are arranged in a fixed position on suitable foundations, not shown. The converter 25 can be tilted or rotated on the trunnions. Converter 25 includes an outer metal shell 29 lined with a layer of refractory material 30. The body portion 31 of the converter is cylindrical or substantially cylindrical. The nose portion 32 of the converter is disposed at angle to the body portion with the axis of the nose portion at an obtuse angle to the axis of the body. This type of converter is known as an eccentric converter.

The converter 25 can be rotated or tilted on trunnions 26 which extend outwardly and in opposite directions from a ring 34 encircling the body portion 31 of the converter 25. On one of the trunnions 26, there is mounted and connected thereto a spur gear 35 which meshes with a vertically movable rack 36 carried by a support 37. The rack 36 is power actuated and when it is desirable to tilt or invert the converter 25, the rack 36 is moved vertically, upwardly or downwardly to rotate the gear 35 and turn the converter 25 about the axes of the trunnions, which axes are horizontally aligned.

The pig iron charged to the converter is blown with a blast of oxygen containing gas, usually air, although oxygen-enriched air or other oxygen containing gas may be used. The bottom of the converter is closed with a detachable bottom 39 which is lined with refractory material. Tuyères, not shown, extend through the bottom and the bottom is detachably held in place by bolts 40. Beneath bottom 39, there is removably fastened a hollow windbox 41. The blast of air for blowing the iron is supplied by means of supply pipe 42 connected to a suitable blower or other source of air under pressure as is customary for converter installations. Pipe 42 is connected through a flexible connection 43 to the outer end of the second trunnion 26 which is hollow. This hollow trunnion is connected by pipe 45 to windbox 41. Pipe 45 is made in sections constructed and arranged to permit easy removal of the windbox 41. When an air blast is supplied to pipe 42, the blast of air flows through connection 43, trunnion 26 and pipe 45 to windbox 41 and from the windbox 41 through bottom 39 and then through the molten metal in the converter 25.

In operation, the rack 36 is moved vertically to turn the converter 25 about 90° from the position shown in Figure 3 so that the converter is on its side. The molten pig iron and the scrap metal, if any, are charged into the converter. Before or at the time when the molten metal is charged into the converter, the blast is turned on to prevent the metal from entering and clogging the tuyères. As soon as charging of the metal has been completed, the converter is turned up to the vertical position by actuation of rack 36. The blowing of the blast through the converter is continued and, when blowing of the metal is completed, the converter is again turned down to pour the blown metal into a receiver such as a ladle. The cycle of operations is then repeated. The converter may be turned in opposite directions for charging and pouring by moving the rack 36 in opposite directions.

After a number of cycles of operations have been completed, the refractory lining 30 becomes so severely eroded that it must be replaced. When the converter must be relined, and in accordance with the usual prior art procedure, the windbox 41 and the bottom 39 are removed. The converter lining remaining in the shell is removed, and the debris drops to the floor 47 beneath the converter and is then removed from the plant. After the old lining has been removed, a new lining of refractory bricks is cemented in place with refractory cementitious material. After the new lining is in place, the lining is heated to drive off the moisture from the cement. When the converter has been completely dried out, the bottom 39 and windbox 41 are attached and the converter then can be put back into operation. Removing the old lining, putting in the new lining and drying out the new lining all takes a long time extending over a number of days. While these various relining steps are being carried out, the converter 25 is out of operation, and no metal is being blown. Accordingly, the production of blown metal drops during this relining period. In addition, when the converter is out of operation, the converter plant requires less molten pig iron from the blast furnace. It is quite difficult to vary the operation of the blast furnace to produce less pig iron so that it becomes necessary to find another outlet for the excess molten pig iron, if possible. Where the mill cannot use this excess metal in some other operation, it may be necessary to cast the molten pig iron into pigs. When the pig iron is cast, it cools and solidifies so that the heat in the molten pig iron is lost. Accordingly, shutting down the converter for relining or other repairs causes a drop in production and also in the amount of molten pig iron used by the plant, and this, in turn, causes other problems to arise.

In accordance with the present invention, there is no material loss of time when it becomes necessary to reline or repair the converter 25. A spare converter 50 is provided on a novel car 51 and when the converter 25 must be relined, it is replaced by the spare converter 50 and the converter 25 is placed on the car 51 and relined at the relining station 22. In order to avoid confusion in the following description, the manipulation of the converter on the car 51 and the relining of a converter, all at the station 22, will be described in connection with converter 50 as though converter 50 had been removed from the blowing station 10 for relining. It is to be understood that converters 50 and 25 are interchangeable and that when either converter is removed from the blowing station and is replaced by the other, the removed converter becomes the spare converter. In practice, there may be either one or a plurality of blowing stations and one relining station. The corresponding portions of converters 50 and 25 will be designated by the same reference numerals.

Before the converter at the blowing station 10 is removed, the spare relined converter on car 51 is removed from the car. The spare converter may be set aside in any suitable location, and it may be desirable to set the spare converter on the mill floor. The crane 11 is used for removing the spare converter 50 from car 51. Where more than one crane is available, as may be the case in some converter plants, a crane similar to crane 11 may be used to lift converter 50 and then the crane and converter moved to one side out of the way. Before removing the converter 25 from the blowing station 10, the blast pipe 42 is disconnected at 43 and the top halves of bearings 27 are removed so that the converter 25 can be lifted off of the piers 28. Preferably, but not necessarily, the windbox 41 and bottom 39 are removed. Before the converter is lifted off of the piers 28, the rack 36 is actuated to invert the converter. A pair of lifting lugs 54 are mounted on opposite sides of the converter below trunnions 26 and between the trunnions 26 and the bottom of the converter. A second pair of lugs 55 are mounted on opposite sides of the converter above the trunnions 26. When the converter is inverted by means of rack 36 and gear 35, the lugs 54 will be above the trunnions. The crane 11 is then moved into position and lifts the converter 25 from the piers by means of a sling 56 extending from crane hook 20, the ends of the sling are adapted to engage the two lifting lugs 54. The cable 19 is then shortened to lift the converter and the crane is then moved over to the car 51 and placed on the car 51.

After the converter has been removed from the blowing station 10, the spare converter is lifted off the mill floor 47 and lowered into position on piers 28. The blast pipe 42 is connected, and if they have not already been attached, the bottom 39 and the windbox 41 are attached. The upper halves of the bearings 27 are bolted in place and the spare converter is put into operation very quickly. A spare bottom 39 preferably is provided so that no time is lost waiting for the bottom to be relined.

When the converter is removed from the blowing station 10 to the relining station 22, the removed converter becomes the spare and will be referred to as converter 50. The converter 50 is placed on car 51 by means of crane 11 when the car is in the loading and unloading position A, shown in full lines in Figures 1 and 2, and the car is subsequently moved to positions B and C, all as will be more fully hereinafter described.

Figure 4:
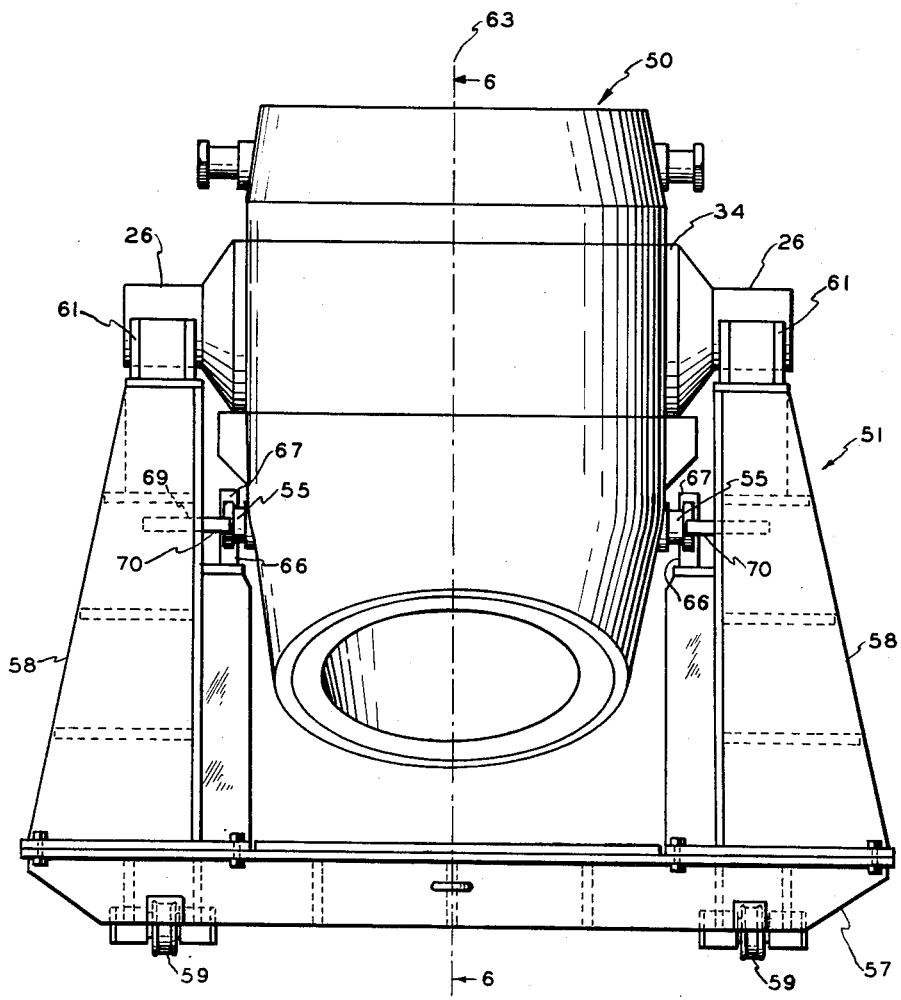
Figure 4 is an enlarged side elevational view of the converter car of Figure 1.

Referring more particularly to Figures 4, 5 and 6 which illustrate the construction of car 51, the converter car 51 includes a base or floor portion 57 and spaced supports 58 bolted or otherwise fastened together to form a unitary car or carriage frame mounted on wheels 59. As shown in Figures 1 and 2, the car wheels are mounted on rails 60 for movement therealong to positions A, B and C. If desirable, a different type of wheels 59 may be used. The car frame carries a pair of bearings 61 with one bearing 61 being mounted on each support or upright 58 in position to receive the corresponding trunnions 26. Preferably, the bearings 61 are open bearings facing upwardly so that the converter can be placed in or removed from the bearings without the necessity of removing bearing caps.

The car 51 includes means for holding the converter in the desired position and for preventing the converter from tilting, particularly when the car 51 is moved along the rails 60. As shown more clearly in Figures 5 and 6, the guide lugs or protuberances 55 of the converter are in line with trunnions 26 between the trunnions and the top or nose 32 of the converter. As previously pointed out, the converter body 31 is substantially cylindrical while its nose 32 is of the eccentric type. The center of gravity of the converter is not located along line 63 which is the longitudinal axis of the converter, particularly of the body portion, but is located to the left of line 63 approximately at 64, as viewed in Figure 5. Thus, the lugs 55 are to one side of the center of gravity 64.

The car 51 includes a cam 66 mounted on the car frame below each bearing 61. Each cam 66 includes a cam surface 67 that is inclined upwardly and laterally from a point substantially directly below the center of the corresponding bearing 61. When the converter is lowered to be placed into position in the bearings 61, the converter is supported by the lugs 54 and due to the location of its center of gravity the axes of the trunnions and the lugs 55 are not in a vertical plane but the axis of the lugs 55 is to one side of a vertical plane including the trunnion axes and the center of gravity. Stated in another way, the center of gravity 64 is to one side of a plane including the trunnion axes and the lugs 55, particularly the cam-engaging surfaces of the lugs. The cam surface 67 is inclined away from the last mentioned plane. Thus, as the converter is lowered into position and before the trunnions 26 are positioned in the bearings 61, the lugs 55, which act as cam followers, first engage the cam surfaces 67 and then the cam followers 55 slide down along the inclined cam surfaces 67. This rotates the converter and moves the cam followers 55 to the left or in a direction toward the center of gravity. When the trunnions 26 come to rest in the bearings, the center of gravity 64 is to one side of a vertical plane including the trunnion axes, and the cam surfaces 67 are inclined away from this plane in a direction opposite to the center of gravity. The lugs 55 are urged against the cam surfaces 67 by gravity so that the weight of the converter urges the lugs 55 against the cams and tends to hold the converter in the position shown in full lines. This arrangement tends to reduce tilting of the converter because of the location of the center of gravity with respect to the axis of the trunnions. Preferably, a slot 69 is provided in each support portion 58 and below the corresponding bearing 61 but spaced from the corresponding cam surface 57. After the converter is in position, a bar 70 can be inserted through each slot to engage the corresponding lug 55 on a side opposite to that side which engages cam surface 57. Preferably, a slot bracket 71 is mounted on each upright and the bar 70 extends through a bracket 71 and a slot 69 so as to provide better support for the bar. The bars 70 prevent the lugs from moving away from the cams and the converter cannot tilt if the car is given a sudden yank while being moved or if for any reason the converter becomes unbalanced so that it tends to tilt away from the cams 56. In addition, the cam surfaces are arranged so as to hold the converter in such a position that the axis of the body portion is substantially vertical for the reasons more fully hereinafter described.

The rails 60 extend across a pit 72 below the level of the floor 47. After the converter has been positioned on the car 51 while in the loading and unloading position A, the car 51 is moved along the rails to position B over the pit 72. Any suitable means may be provided for moving the car back and forth along the rails. As shown, a cable drum 74 and an electric motor 75 for driving the drum 74 are mounted in a suitable receptacle 76. A cable 77 is mounted on drum 74, and the cable has on its outer end a hook 78 which detachably engages an "eye" 79 on the car 51. When it is desirable to move the car 51 to the left, Figure 2, the hook 78 is attached to "eye" 79 and the motor energized to rotate the drum 74 and reel in the cable 77 and move the car 51 along the rails 60.

Similarly, a cable drum 81 and its drive motor 82 are mounted in a receptacle 83 for moving car 51 in the opposite direction along rails 60. Drum 81 also carries a cable 84 having a hook 85 on its outer end engaging eye 86 on the opposite end of car 51. When motor 82 is energized, the drum 81 is rotated and the car 51 is moved toward the right along rails 60. Thus, there is power-actuated means for moving the car 51 in either direction along the rails. When it is intended to leave the car in one position, the cables may be detached from the car and stored in their respective receptacles. In addition, and as will be subsequently described, the hook 85 and particularly hook 78 may be attached to the converter for tilting the converter.

After the converter has been placed on car 51 and the car moved to position B, the old refractory material is removed. The car floor 57 includes an opening or passage 89. A cover plate 90 normally covers this opening. Before the old lining is removed, the cover 90 is taken off so that the debris can drop through the car into the pit 72 and out of the way. The old lining may be removed with the converter positioned so that the axis of the body portion 31 is vertical as is shown in full lines in Figure 5. Preferably, the converter is tilted so that the axis of the eccentric nose 32 is substantially vertical and the nose opening is substantially horizontal as shown in broken lines in Figure 5. Accordingly, means are provided for holding the converter in the last described position. As shown in Figures 5 and 6, a pair of spaced slots 92 are provided in plate 93 forming part of each upright or post 58. The slots 92 are laterally spaced apart a distance substantially equal to the width of lugs 55. A slotted bracket 95 is mounted on each upright 58. A pair of bars 96 are inserted through slots 92 and slotted bracket 95 to hold the converter in the tilted position. Before the converter is tilted, the bars 96 are removed and the hook 78 on cable 77 is attached to the converter at any convenient point and the drum 74 is then rotated to tilt the converter. After the converter has been tilted, the bars 96 are positioned on opposite sides of the lugs 55 for holding the converter in this position. With the converter tilted to the position shown in broken lines in Figure 5, the debris can more readily drop into pit 72.

After the old eroded lining has been removed, a new lining must be placed inside of the converter shell 31. To facilitate relining the converter, a building or shed 98 is provided at the relining station 22. The building frame includes vertical posts 99 and horizontal beams 100 which support a floor 101 below the bottom of the inverted converter, that is, the converter extends above the floor 101. As shown in Figure 1, the floor 101 is U-shaped with one leg 102 extending along one side and with the other leg 103 extending forwardly along the opposite side of the converter. The U-shaped floor 101 includes a base portion 104 connecting the leg portions 102 and 103. The base portion 104 is not permanently attached to and is readily removable from beams 100 to permit movement of the car to position C. The U-shaped floor 101 faces or has its opening toward the loading station A to permit movement of the car from the car 51 from position A to position B without interference with the floor. The floor 101 permits the workmen to move around the upper portion of the converter.

The building 98 includes a protective roof 106 and a crane 107 that is smaller than but similar to crane 11. Like crane 11, crane 107 is universally movable. Crane 107 is utilized for lifting materials up to platform 101. Rails 108 extend outside the building 98 so that materials stored in the yard may be brought into the building.

The relining of the converter 50 on the car 51 while in the relining position B at the relining station 22 may be carried out in any suitable manner and, if desirable, temporary platforms, not shown, may be erected on the car platform and cover 90. Usually, such platforms are desirable to facilitate relining the relatively high converter.

Before or after the converter is relined, it may be desirable to replace the liners 110 on trunnions 26. This is quite difficult to accomplish while the converter is at the blowing station. A shelf or projection 111 is provided on each upright below the bearings 61. Jacks can be placed on these projections for lifting the converter trunnions part way out of the bearings so that sleeves 110 can be readily removed and replaced by new sleeves, after which the converter is lowered back into position.

After the converter 50 has been relined, the car 51 may be moved to position A, particularly if the spare converter is needed to replace an eroded converter at a blowing station. The converter may not be needed immediately and usually is moved by means of cable 77 to position C to expose the pit 72 and permit the debris to be removed from the pit. Usually the car will be left in the storage position C after being moved from the relining position B until needed. The car is out of the way in position C. In some converter plants, the floor is covered with tracks for bringing ladles into and out of the plant, and the car at position A may block some of these tracks. It is preferable to have only the loading and unloading position A inside of the converter plant or building and to have the relining position B and the storage position C outside of the converter building. Before the car is moved from position B to position C, the back portion 104 of the platform 101 is removed.

Assuming the car 51 to be in position C and that the spare converter has been relined and is ready for use, and that operation of the blowing station has progressed so that the converter at the blowing station must be relined. When the converter at the blowing station must be relined, the car 51 is moved from position C out to position A. The converter is then lifted off of the car by means of the crane 11. The converter at the blowing station is then lifted from the blowing station by the crane 11 and transferred to the car 51. As the converter is lowered onto the car, the lugs 55 slide down along the cam surfaces 67 so that when the trunnions 26 are in position in the bearings 61, the converter is in the vertical position shown in Figure 5. With the converter in this position, the lugs 55 are urged against the cam surfaces 67 by gravity. Before moving the car 51 to position B over the pit 72, a bar 70 is placed in position to prevent tilting of the converter. The cable 77 is then attached to the car and the car is moved over the pit 72. The old lining may be removed from the converter while the converter is in this position. Preferably, the cable 77 is removed from the car and attached to the converter and the bar 70 is removed. The motor 75 is then energized to tilt the converter to the position shown in broken lines in Figure 5. The bars or pins 96 are then slid into position to engage the opposite sides of the lugs 55 to hold the converter in the tilted position. After the old lining has been removed, the nose of the converter is relined with the converter held in the tilted position. After the nose has been relined, the bars 96 are removed and the converter is tilted back to the vertical position for relining of the body portion 31. After the converter has been relined, the car is moved to position C and the debris is removed from pit 72.

Relining of the converter at the relining station 22 does not affect operation of the blowing station 10. As soon as the new converter is positioned on the piers 28 and the various connections made, the converter can be put back into operation. Time is not lost as a result of relining the converter or as a result of having to dry out the lining.

I claim:

1. A car for supporting and transporting a steel converter with the nose downward of the type having a trunnion on two opposite sides and an outwardly extending lug on a side of the converter between a trunnion and the nose of the converter, the center of gravity of the converter being at one side of a plane passing through the axes of the trunnions and the center of the lug, said car comprising, in combination, a frame including spaced uprights, wheels movably supporting the frame, bearing means on each upright rotatably engaging the trunnions for supporting a converter so that the converter can be tilted about the axis of the trunnions, and a cam on an upright below the corresponding bearing means including a cam surface for engaging a surface of the lug, the cam surface being inclined upwardly and laterally from a point substantially directly below the center of the corresponding bearing means.

2. A car for supporting and transporting a steel converter with the nose downward of the type having a trunnion on two opposite sides and an outwardly extending lug on a side of the converter between a trunnion and the nose of the converter, the center of gravity of the converter being at one side of a plane passing through the axes of the trunnions and the center of the lug, said car comprising, in combination, a frame including spaced uprights, wheels movably supporting the frame, bearing means on each upright rotatably engaging the trunnions for supporting a converter so that the converter can be tilted about the axis of the trunnions, a cam on an upright below the corresponding bearing means including a cam surface for engaging a surface of the lug, the cam surface being inclined upwardly and laterally from a point substantially directly below the center of the corresponding bearing means, a floor between the uprights, an opening in the floor through which debris from the converter may pass, and a removable cover on the floor closing the opening.

3. A car for supporting and transporting a steel converter with the nose downward of the type having a trunnion on two opposite sides and an outwardly extending lug on a side of the converter between a trunnion and the nose of the converter, the center of gravity of the converter being at one side of a plane passing through the axes of the trunnions and the center of the lug, said car comprising, in combination, a frame including spaced uprights, wheels movably supporting the frame, bearing means on each upright rotatably engaging the trunnions for supporting a converter so that the converter can be tilted about the axis of the trunnions, a cam on an upright below the corresponding bearing means including a cam surface for engaging a surface of the lug, the cam surface being inclined upwardly and laterally from a point substantially directly below the center of the corresponding bearing means and being on the opposite side of the plane from the center of gravity of the converter whereby the lug is urged against the cam surface under the influence of gravity, and means spaced from the cam surface for engaging a surface of the converter lug opposite the surface of the converter lug engaged by the cam surface.

4. A converter car adapted to support a converter, said converter including a cylindrical body having an eccentric nose at one end and trunnion means on the body portion and converter cam means between the trunnion means and the eccentric nose, the converter cam means having a camming surface and the converter cam means and the trunnion means lying in a common plane on one side of the center of gravity of the converter, the center of gravity being located between the trunnion means and the eccentric nose, the converter car comprising a car frame including spaced uprights, wheels for supporting the car frame, bearing means on the spaced uprights adapted to receive the trunnion means and support the converter between the spaced uprights for swinging movement about the trunnion means, car cam means having a camming surface supported on the car frame, the camming surfaces of the car cam means and the converter cam means being in camming relation with the trunnion means in the bearing means and with the converter in a nose-down position, the camming surfaces being operable when in camming relation to rotate the converter about the axis of the trunnion means to a position in which the common plane of the trunnion means and the converter cam means is substantially coincident with a vertical plane passing through the bearing means, the car cam means being on one side of the vertical plane and the center of gravity of the converter being on the other side of the vertical plane, whereby the converter cam means is urged by gravity into engagement with the car cam means.

5. A converter car adapted to support a converter, said converter including a cylindrical body portion having an eccentric nose at one end and trunnion means on opposite sides of the body portion and converter cam means on each side of the body portion below the trunnion means and between the trunnion means and the eccentric nose, each of the converter cam means having a camming surface, the converter cam means and the trunnion means lying in a common plane on one side of the center of gravity of the converter, the center of gravity of the converter being located between the trunnion means and the eccentric nose, the converter car comprising a car frame including spaced uprights, wheels for supporting the car frame, bearing means on the spaced uprights adapted to receive the trunnion means and support the converter between the spaced uprights for swinging movement about the trunnion means, car cam means having a camming surface supported on each of the uprights below respective bearing means, the camming surfaces of the car cam means and the converter cam means being in camming relation with the trunnion means in the bearing means and with the converter in a nose-down position, the camming surfaces being operable when in camming relation to rotate the converter about the axis of the trunnion means to a position in which the common plane of the trunnion means and the converter cam means is substantially coincidental with a vertical plane passing through the bearing means, the car cam means being on one side of the vertical plane and the center of gravity of the converter being on the other side of the vertical plane, whereby the converter cam means is urged by gravity into engagement with the car cam means.

6. A converter car as defined in claim 5 in which lock means are provided for locking the converter with its body portion in a vertical position and with the converter cam means contacting the car cam means.

7. A converter car as defined in claim 5 in which means are provided for supporting the converter with its eccentric nose in a vertical position.

8. A converter car as defined in claim 5 provided with a floor between the uprights below the converter and an opening in the floor through which debris from within the converter may pass, and a removable cover for closing the opening.

References Cited in the file of this patent

UNITED STATES PATENTS

| Number | Name | Date |
|--------|------|------|
| 16,082 | Bessemer | Nov. 11, 1856 |
| 75,240 | Bennett | Mar. 10, 1868 |
| 86,303 | Holley | Jan. 26, 1869 |
| 122,052 | Pearse | Dec. 19, 1871 |
| 570,052 | De La Sauce | Oct. 27, 1896 |
| 697,740 | McCullough et al. | Apr. 15, 1902 |
| 851,912 | Beaudet | Apr. 30, 1907 |
| 954,561 | Astrom | Apr. 12, 1910 |
| 963,435 | Hare | July 5, 1910 |
| 1,489,688 | Astrom | Apr. 18, 1924 |
| 1,812,314 | Astrom | June 30, 1931 |
| 1,839,701 | Pollock et al. | Jan. 5, 1932 |
| 1,860,844 | Sorensen | May 31, 1932 |
| 2,333,450 | Staley | Nov. 2, 1943 |
| 2,421,973 | Trimble | June 10, 1947 |
| 2,444,461 | Morey et al. | July 6, 1948 |

FOREIGN PATENTS

| Number | Country | Date |
|--------|---------|------|
| 572,377 | Great Britain | Oct. 5, 1945 |